July 21, 1959 — C. E. BRANICK — 2,895,711
DEVICE FOR INSPECTING PNEUMATIC TIRES
Filed May 2, 1957 — 4 Sheets-Sheet 1
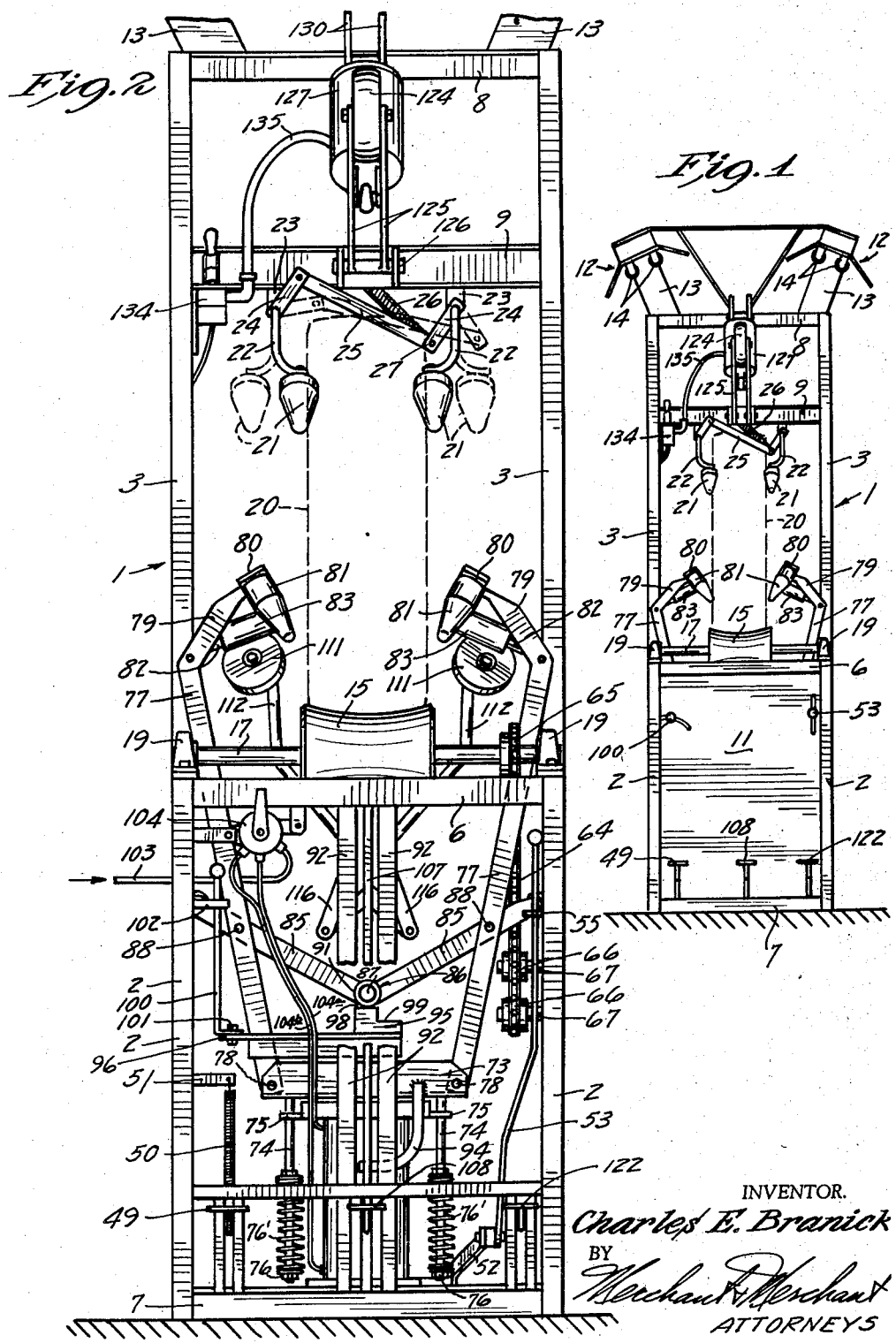
INVENTOR.
Charles E. Branick
BY
Merchant & Merchant
ATTORNEYS July 21, 1959 C. E. BRANICK 2,895,711
DEVICE FOR INSPECTING PNEUMATIC TIRES
Filed May 2, 1957 4 Sheets-Sheet 2

INVENTOR.
Charles E. Branick
BY
Merchant & Merchant
ATTORNEYS

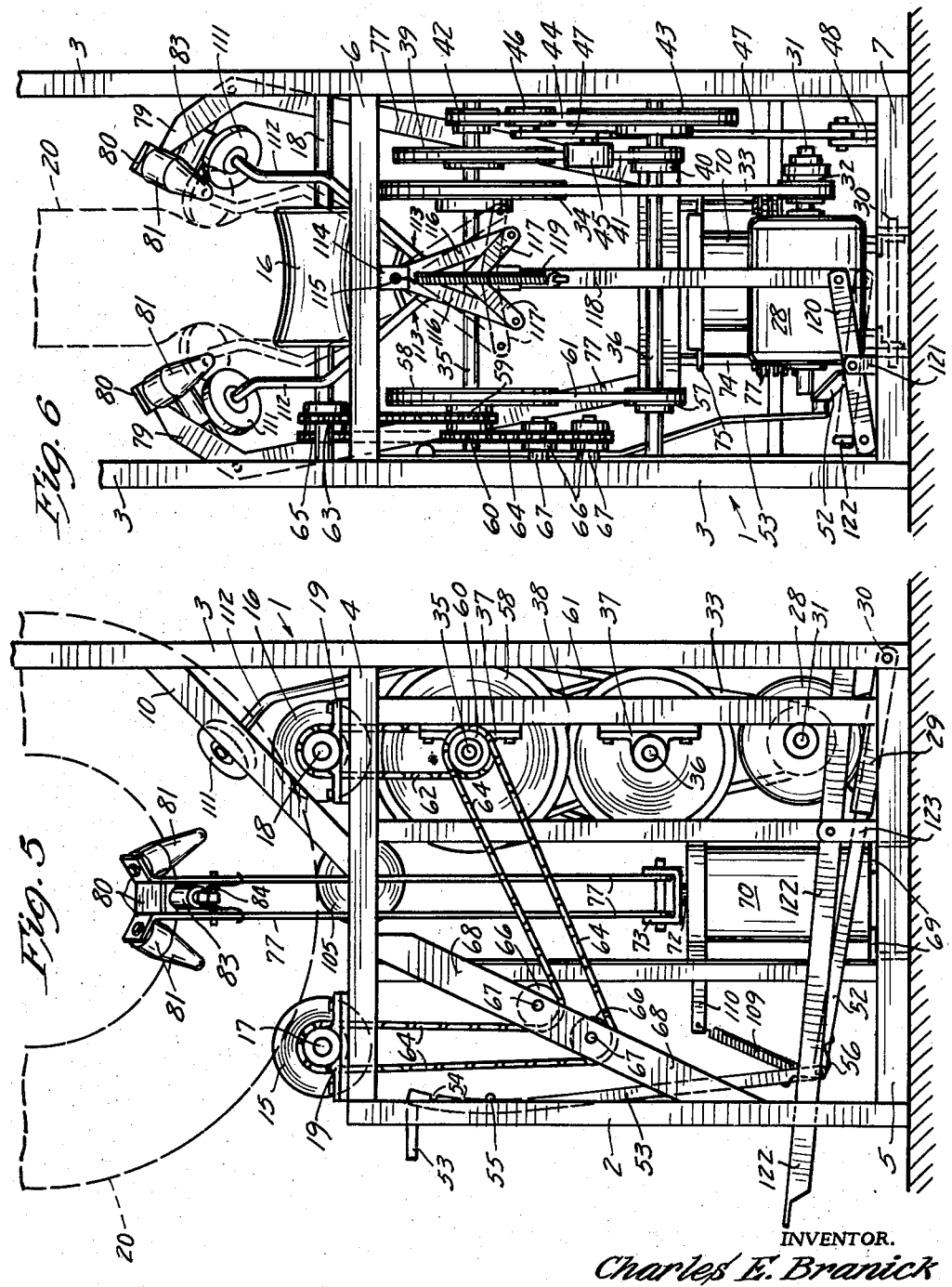

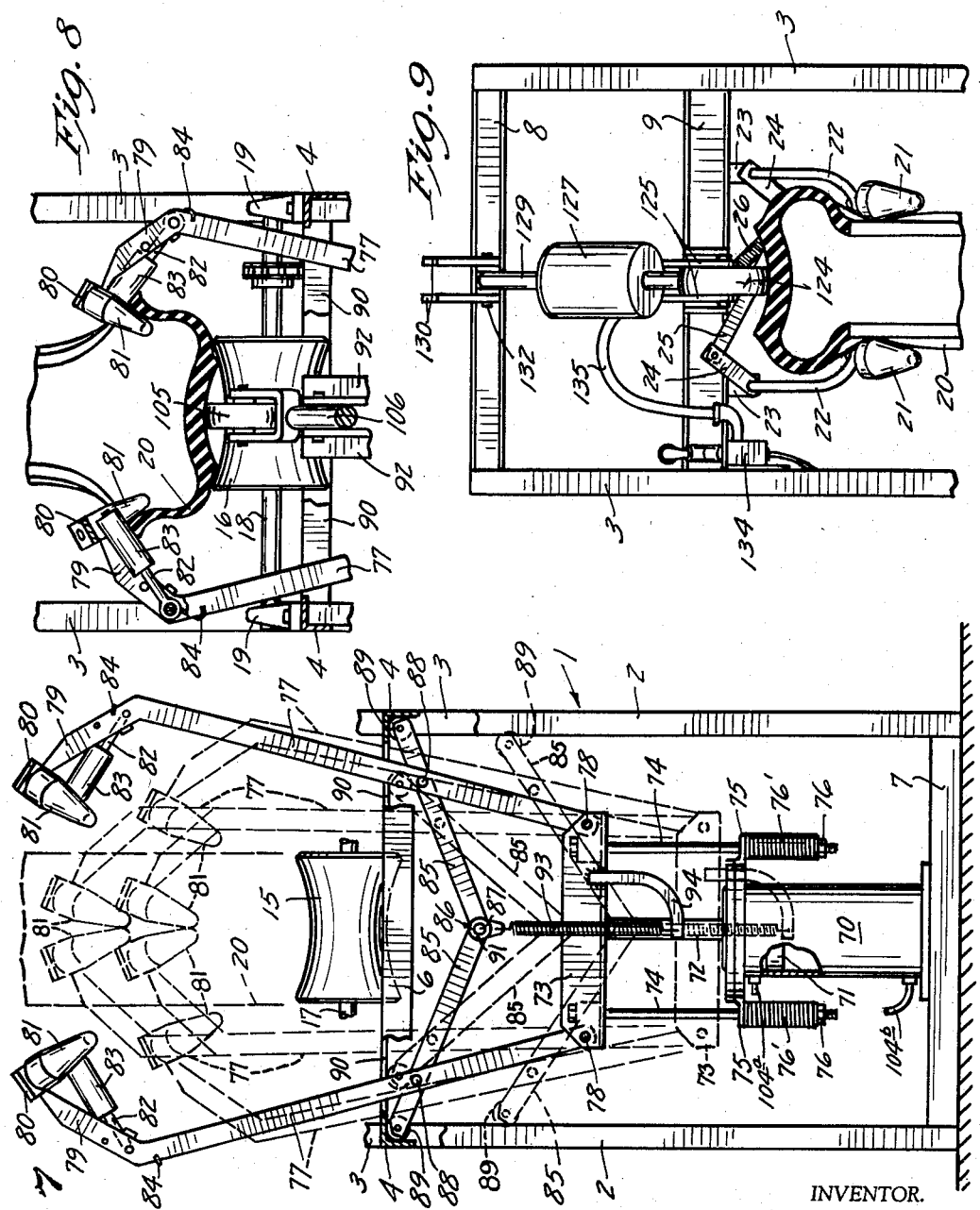

United States Patent Office 2,895,711
Patented July 21, 1959

2,895,711

DEVICE FOR INSPECTING PNEUMATIC TIRES

Charles E. Branick, Fargo, N. Dak.

Application May 2, 1957, Serial No. 656,674

13 Claims. (Cl. 254—50.3)

My present invention relates generally to pneumatic tire handling and repairing equipment, and more particularly to devices for handling tire casings whereby inspection and repair of the tire casing may be facilitated.

It is recognized by those skilled in the art that pneumatic tires, particularly those used in automotive transportation, are subject to damage from various causes such as sharp edges of stones or curbing, chuck holes, etc., as well as improper tire inflation, punctures, and the like. Such damage takes several forms, such as holes through the casing, radial cracks in the outer side wall surfaces, ply separation, cord breakage and the like. Some of these are visible on the outside of the tire, whereas others may be seen on the inner surface thereof. Further, some damage cannot be detected when the tire casing is in an uninflated condition and requires spreading of the beads of the tire or stretching of various portions of the tire to cause said damage to be visible to the operator or service man.

An important object of my invention is the provision of a device for inspecting tires which will accommodate tires of various sizes with a minimum of adjustment, and in which said tires may be quickly and thoroughly inspected with a minimum of effort on the part of the operator.

Another object of my invention is the provision of novel tire supporting and driving means whereby a tire may be rotated during inspection thereof and supported against falling from an upright position during such inspection.

Still another object of my invention is the provision of novel means for inverting the road-engaging crown portion of the tire to facilitate the inspection and repair of the central inner surface portion of the tire underlying said crown portion.

Another object of my invention is the provision of a device of the type set forth having novel means for spreading the bead portions of a tire and inverting the side wall portions of the tire adjacent the spread bead portions so that inspection of the inner surfaces of said side walls may be easily inspected and repaired if repair is found to be necessary.

A still further object of my invention is the provision of novel means for causing the side walls of a tire to bulge outwardly so that, if external radial cracks are present in the tire side walls, such cracks will be rendered easily visible to the operator.

Another object of my invention is the provision of a device as set forth having novel tire spreading mechanism including tire bead engaging elements which, when the spreading mechanism is energized, automatically move to position radially and axially inwardly of the bead of the tire, from thence radially outwardly into engagement with the tire beads, and from thence axially of the tire in opposite directions to spread the engaged bead portions thereof to a predetermined spaced apart relationship.

Another object of my invention is the provision of a device as set forth which is simple and inexpensive to manufacture relative to other machines of this general type, which is highly efficient in operation, and which is rugged in construction and durable in use.

The above, and still further highly important objects and advantages of my invention will become apparent from the following detailed specification, appended claims, and attached drawings.

Referring to the drawings, which illustrate the invention, and in which like reference characters indicate like parts throughout the several views.

Fig. 1 is a view in front elevation of a machine built in accordance with my invention;

Fig. 2 is an enlarged view corresponding to Fig. 1 but showing some parts removed and some parts broken away;

Fig. 5 is a view in side elevation as seen from the right to the left with respect to Fig. 2, some parts being broken away and some parts removed;

Fig. 6 is a fragmentary view in rear elevation;

Fig. 7 is a vertical section taken substantially on the line 7—7 of Fig. 3, some parts being broken away and some parts removed;

Fig. 8 is a fragmentary vertical section taken substantially on the line 8—8 of Fig. 3 but showing a different position of some of the parts; and Fig. 9 is a view corresponding to the upper end portion of Fig. 2 but showing a different position of some of the parts.

Figures 3, 4:
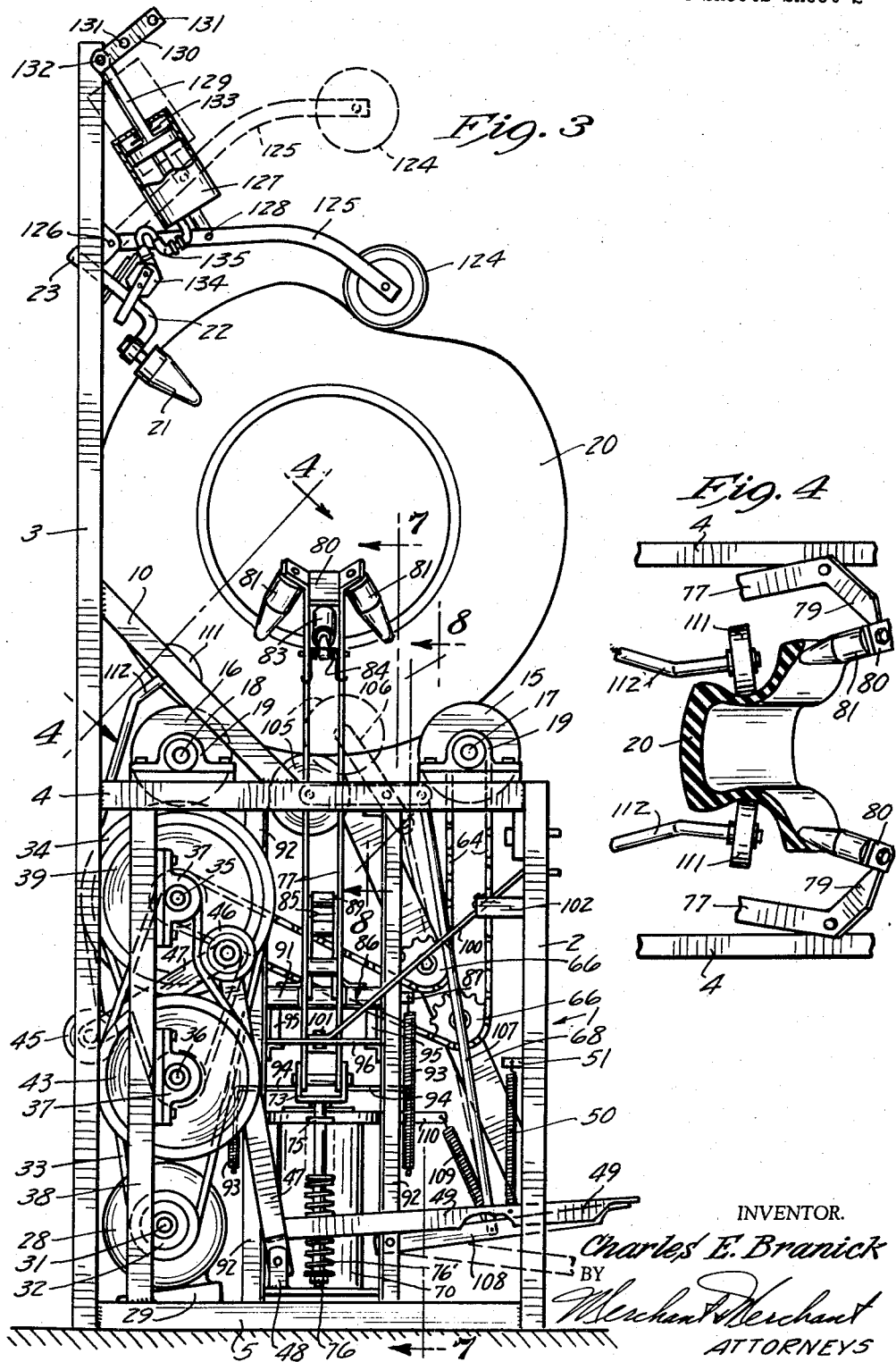
Fig. 3 is a view in side elevation as seen from the left to the right with respect to Fig. 2, some parts being removed and some parts being broken away.
Fig. 4 is a fragmentary section taken substantially on the line 4—4 of Fig. 3.

Referring with greater detail to the drawings, a generally rectangular frame structure is indicated in its entirety by the numeral 1, and comprises laterally spaced front legs 2, a pair of elongated laterally spaced rear legs 3, horizontally disposed upper side frame members 4 connecting the upper ends of the front legs 2 with the intermediate portions of the rear legs 3, lower side frame members 5, and horizontally disposed upper and lower cross frame members 6 and 7 respectively at the front and rear portions of the frame structure 1. The front and rear legs 2 and 3 respectively are preferably made from cross sectionally rectangular metal tubing, the side and cross frame members preferably being made from conventional angle iron. The rear legs 3 are connected at their upper end portion by a pair of horizontally disposed vertically spaced cross bars 8 and 9, and are reinforced by angle braces 10 that are welded or otherwise rigidly secured at their opposite ends to the upper side frame members 4 and the legs 3, see particularly Figs. 3 and 5. The interior of the frame structure 1 below the side frame members 4 and cross frame members 6 is preferably enclosed by panels such as indicated at 11 in Fig. 1, other panels normally covering the side and rear portions of the frame structure being removed. A pair of light fixtures 12 are mounted to the cross bar 8 at the upper ends of the rear legs 3 by means of brackets 13. Said fixtures 12 implying conventional tubular lamps 14 to properly illuminate the work. The fixtures 12 and lamps 14 are of well-known types and, not in themselves comprising the instant invention, further detailed showing and description thereof is omitted.

A pair of tire supporting and driving rollers 15 and 16 are mounted on respective horizontally disposed shafts 17 and 18 that are journalled in respective bearings 19 mounted on the upper side frame members 4. As shown, the rollers 15 and 16 have concave peripheral surfaces which are adapted to engage circumferentially spaced road engaging crown surface portions of a pneumatic tire casing indicated generally at 20 to support the tire casing 20 and rotate the same on its normal horizontal axis. To restrain the tire 20 from tipping to either side of its generally vertical position, I provide a pair of tire side wall engaging tapered guide rollers 21 that are journalled to the outer ends of laterally spaced crank arms 22 on laterally spaced parallel axes generally normal to the axis of the tire 20 when positioned on the supporting rollers 15 and 16. The inner ends of the crank arms 22 are journalled in bearings 23 for swinging movements on axes parallel to the axes of their respective guide rollers 21, said bearings 23 being mounted on the cross bar 9. Each of the crank arms 22 is provided with a radially outwardly projecting secondary crank arm 24 the outer end of each of which is pivotally connected to an adjacent end of a rigid connecting link 25, the arrangement being such that movement of one of the guide rollers 21 toward and away from engagement with the adjacent side wall of the tire 20 will cause corresponding movement of the other guide roller 21 in the opposite direction, so that both guide rollers 21 move simultaneously into or out of engagement with the tire 20. A coil tension spring 26 is anchored at one end to the pivotal connection between one of the secondary crank arms 24 with the adjacent end of the link 25, as indicated at 27, and at its other end to the intermediate portion of the cross bar 9, whereby to yieldingly urge the guide rollers 21 toward engagement with their respective side walls of the tire 20. When the tire 20 is placed on the supporting rollers 15 and 16, the upper portion of the tire engages the tapered peripheral surfaces of the guide rollers 21 and forces its way therebetween against bias of the spring 26, said bias being only sufficient to cause the tire to be held against said tipping movement.

Means for rotating the rollers 15 and 16, to impart rotation to the tire 20 on its own axis, comprises a drive motor 28 and transmission mechanism now to be described. The drive motor 28 is mounted on a base 29 that is pivotally connected to the lower rear cross frame member 7, as indicated at 30, and has mounted on its drive shaft 31 a variable pitch pulley 32 over which runs an endless drive belt 33. The pulley 32 is of the type commonly used in belt equipped transmission mechanism where variable output speed is required and, it is believed, need not be described in further detail. The drive belt 33 runs over and has driving engagement with a relatively large diameter pulley 34 that is rigidly secured to the former of a pair of vertically spaced countershafts 35 and 36, said shafts 35 and 36 being journalled in spaced bearings 37 in vertically spaced parallel relationship. The several bearings 37 are rigidly mounted on a pair of vertically disposed supporting bars 38 disposed at opposite sides of the frame structure 1 and welded or otherwise rigidly secured at their opposite ends to adjacent side frame members 4 and 5. A pair of cooperating relatively large and relatively small diameter pulleys 39 and 40 are rigidly secured to respective countershafts 35 and 36, and have running normally loosely thereover an endless belt 41. A second pair of cooperating relatively small and relatively large pulleys 42 and 43 are secured to the shaft 35 and 36 respectively in axially spaced relation to the pulleys 39 and 40 respectively and have running normally loosely thereover an endless belt 44. The normal loose engagement of the belt 41 and 44 permits rotation of the countershaft 35 without transmission of such rotation to the second countershaft 36. Tightening of either of the belts 41 or 44 causes the countershaft 36 to be rotated at a low or a high speed relative to that of the first countershaft 35 as desired. Means for selectively tightening the belts 41 and 44 to effect a driving connection between the countershaft 35 and the second countershaft 36 at the desired speed differential comprises a pair of idler rollers 45 and 46 journalled to spaced portions of an angular lever arm 47 that is pivotally mounted to the frame structure 1 by means of a bracket 48. The idler roller 45 is positioned to engage and tighten the belt 41 upon movement of the lever 47 in one direction, whereas the idler roller 46 is positioned to engage and tighten the belt 44 upon movement of the lever 47 in the opposite direction. An elongated foot operated treadle element 49 is welded or otherwise secured to the lever 47 and projects forwardly through a suitable opening in the front panel 11 at a height within easy reach of the foot of an operator. A coil tension spring 50 secured at one end to the treadle 49 and at its opposite end to a lug 51 welded or otherwise secured to the adjacent leg 2 of the frame structure, yieldingly urges the treadle 49 toward its upper limit of movement wherein the lever 47 carries the idler roller 46 into operative belt tightening engagement with its respective belt 44 to cause the countershaft 36 to be driven at a relatively slow speed. Obviously, downward movement of the treadle 49 against bias of the spring 50 will cause the idler roller 46 to move out of engagement with its respective belt 44 and the idler roller 45 to move into operative belt tightening engagement with its respective belt 41 to cause the countershaft 36 to be driven at high speed relative to the countershaft 35. The variable speed pulley 32 is utilized to vary the speed of the countershaft 36 when the same is operated in either the low or high speed range. Operation of the variable speed pulley 32 is to vary the speed of the first countershaft 35 and is accomplished by raising or lowering the drive motor 28. For this purpose I provide an arm 52 which projects forwardly from the motor base 29, and which at its front end is pivotally connected to the lower end of a handle equipped lifting link 53 that extends upwardly from the front end of the arm 52 and which at its upper end portion is provided with a plurality of notches 54 that are adapted to selectively engage and receive a locking pin 55 projecting laterally inwardly from the adjacent front leg 2 of the frame structure. A torsion spring 56, is disposed at the pivotal connection between the arm 52 and the lifting link 53, and yieldingly urges the lifting link 53 in a direction to cause the locking pin 55 to be received in a given notch 54. Thus, by raising the link 53, the drive belt 33 is caused to engage the drive pulley 32 adjacent its outer peripheral portion to drive the first countershaft 35 at a relatively fast speed, whereas lowering of the lifting link 53 causes the drive belt 33 to engage the smaller diameter inner portion of the variable speed pulley 32 to operate the shaft 35 at a slower rate.

A relatively small pulley 57 is rigidly secured to the second countershaft 36 in alignment with a relatively large pulley 58 that is journalled on the first countershaft 35, said large pulley 58 having rigidly connected thereto for common rotation therewith independently of the countershaft 35 a pair of sprocket wheels 59 and 60. An endless drive belt 61 is entrained over the pulleys 57 and 58, and an endless link chain 62 runs over the sprocket wheel 59 and another sprocket wheel 63 rigidly mounted on the tire supporting roller shaft 18. A second endless link chain 64 runs over the sprocket wheel 60 and over another sprocket wheel 65 fast on the tire supporting roller shaft 17. Between the sprocket wheels 60 and 65, the link chain 64 runs over a pair of idler pulleys or rollers 66 that are journalled on stub shafts 67 rigidly mounted on a supporting bar 68 welded or otherwise rigidly secured to the adjacent front leg 2 and upper side frame member 4, see particularly Fig. 5. With the above arrangement, the tire supporting and driving rollers 15 and 16 are driven in like direction and at like speeds.

Tire Spreading Mechanism

Rigidly secured to a pair of transverse base members 69 of the frame structure 1, is a vertically extended fluid pressure cylinder 70 having mounted therein for axial movements a piston 71 to which is secured the inner end of a piston rod or plunger 72. The plunger rod 72 extends upwardly through a conventional packing gland not shown in the upper end of the cylinder 70, and terminates at its upper end in a crosshead 73. The crosshead 73 is provided at its opposite ends with a pair of depending guide rods 74 which extend downwardly through suitable openings in a pair of diametrically opposed guide lugs 75 at the upper end of the cylinder 70. The lower ends of the guide rods 74 are threaded to receive adjustment nuts 76 between which and their respective guide lugs 75 are interposed coil compression springs 76' which yieldingly limit upward movement of the crosshead 73 and plunger rod 72, for a purpose which will hereinafter become apparent. A pair of generally vertically extending bifurcated spreader arms 77 are pivotally secured at their lower ends on parallel horizontal axes to opposite ends of the crosshead 73, as indicated at 78. The arms 77 have inturned upper end portions 79 to which are rigidly secured head elements 80 to the opposite end of which are journalled angularly downwardly extending spreader rollers 81. With reference to Figs. 3 and 5 it will be seen that each of the arms 77 is provided with a pair of the tapered spreading rollers 81, the axes of the rollers of each pair thereof diverging in a downward direction, said pairs of rollers being adapted to engage opposed inner wall surface portions of the tire 20 at the beads thereof. A pair of stems 82 are pivotally mounted to the arms 77 at the inturned ends 79 thereof for limited swinging movements in the planes of the arms 77, and have journalled thereon pressure rollers 83 that are adapted to engage the inner peripheral surfaces of the tire beads, see Fig. 8. Torsion springs 84 yieldingly urge the stems 82 and their respective pressure rollers 83 toward engagement of the rollers 83 with the beads of the tire 20, said pressure rollers preventing the tire beads from rubbing against the inturned ends 79 of the arms 77 when rotary movement is imparted to the tire 20 during engagement of the beads thereof by the spreader rollers 81.

For controlling tire spreading and releasing movements of the spreader arms 77 during movements of the reciprocatory plunger rod 72, I provide a pair of toggle acting control links or arms 85 provided with aligned tubular inner ends 86 that receive a pivot shaft 87 parallel to the pivotal connection 78 between the spreader arms 77 and the crosshead 73. The control arms 85 are pivotally connected at their intermediate portion to the intermediate portions of respective spreader arms 77, as indicated at 88, see particularly Figs. 2 and 7. The outer ends of the control arms 85 are provided with rollers 89 that are adapted to engage the under surfaces of a pair of guide members 90 which project laterally inwardly from their respective upper side frame members 4. The tubular inner ends of one of the control links or arms 85, indicated at 91, extend laterally outwardly beyond the transverse limits of the crosshead 73 and are received between pairs of spaced guide rails 92 extending vertically between the base members 69 and the guide members 90. A pair of coil tension springs 93 are anchored one each to an opposite end of the pivot shaft 87 laterally outwardly of the guide rails 92, and at their other ends to the outer ends of angle brackets 94 the inner ends of which are welded or otherwise rigidly secured to opposite sides of the crosshead 73, to yieldingly urge the inner ends of the control links or arms 85 downwardly toward the crosshead 73.

Downward movement of the inner ends of the control links 85 is limited by engagement of the tubular inner end portions 91 with a pair of abutment elements 95 that are mounted on opposite ends of a horizontally disposed generally U-shaped slide member 96 that is mounted for horizontal movements transversely of the axis of the pivot shaft 87 on a pair of horizontally disposed tracks or rails 97 rigidly secured to the guide rails 92. The abutment elements 95 are each provided with a pair of laterally and vertically spaced abutment faces 98 and 99 that are selectively engaged by the tubular inner end portions of one of said control links 85 to limit downward movement thereof. Means for moving said slide member 96 to position one or the other of the abutment faces 98 or 99 to be engaged by said tubular ends 91 comprises a lever 100 loosely pivotally connected to the intermediate portion of the slide member 96, as indicated at 101, said lever 100 being loosely pivotally connected intermediate its ends to a lug or bracket 102 welded or otherwise rigidly secured to the adjacent front leg 2.

Fluid under pressure is introduced selectively to opposite ends of the cylinder 70 from a source of supply, not shown, through a supply conduit 103, a conventional 3-way valve 104, and a pair of conduits 104a and 104b leading from the valve 104 to the top and bottom portions respectively of the cylinder 70. For the purpose of the present example, the fluid may be assumed to be air, and, when fed to one end of the cylinder 70 under pressure, air from the other end of the cylinder is released to atmosphere through the valve 104. The machine of the instant invention is ready to receive a tire to be inspected when the piston 71 is disposed adjacent the upper end of the cylinder 70. In this position of the piston 71, the spreader arms 77 are disposed as indicated by full lines in Fig. 7. As there shown, the rollers 89 of the control links or arms 85 have operatively engaged the guide members 90 and have moved laterally outwardly into engagement with their respective side frame members 4, in which position the control links 85 are in a maximum spread position. This position of the control links 85 also determines the maximum spread position of the spreader arms 77 and it will be noted, that at this time, the tension springs 93 are longitudinally expanded to be disposed under greater than normal tension. When the tire 20 has been positioned on the supporting rollers 15 and 16, with the upper portion of the tire being supported against lateral tipping by the guide rollers 21, the operator manipulates the 3-way valve 104 to cause fluid under pressure to be delivered to the upper end of the cylinder 70 whereby to cause downward movement to be imparted to the piston 71 and the crosshead 73. The crosshead 73 begins its downward movement, the control arms or links 85 are also moved downwardly therewith together with the spreader arms 77, and the springs 93 tend to swing the control links 85 about their pivot axes 88 in a direction to move the spreader arms 77 toward one another. In other words, initial downward movement of the crosshead 73 causes the spreader rollers 81 to be moved axially inwardly with respect to the tire and radially outwardly toward engagement thereof with the tire beads. Under continued downward movement of the piston 71 and the crosshead 73, when the spreader rollers 81 are disposed between the entire beads, the tubular inner ends 91 of one of the control links 85 engage a selected one of the abutment surfaces 98 or 99 of the abutment elements 95 at which point downward movement of the inner ends of the control links or arms 85 is stopped, and further downward movement of the crosshead 73 causes the control links 85 to swing outwardly about the axis of their common pivot shaft 87 to impart spreading movements to the spread arms 77 to their maximum spread position shown in Figures 2 and 8. Inasmuch as the tire spreading mechanism is independent of the drive motor 28, the tire may be spread while in either a stationary or a rotating condition. By spreading the tire as above described, and causing the same to rotate while the spreader arms 77 are in their operative tire spreading positions, the central portion of the inner surface of the tire about the entire periphery thereof may be progressively examined for injuries or defects. As above noted, and with reference particularly to Fig. 8, it will be seen that the pressure rollers 83 engage the inner peripheral surface of the beads while the same are in a spread condition to permit free rotary movement of the tire with respect to the spreader arms, and preventing the bead portion of the tire from rubbing against the inturned ends 79 of the spreader arms 77.

For the purpose of further facilitating inspection of the inner surface of the road engaging crown portion of the tire and repair thereof if necessary, I provide a crown inverter roller 105 journalled in the bifurcated inner end of a lever 106 that is pivotally secured intermediate its end to the upper end of one of the pairs of guide rails 92. The outer end of the lever 106 is pivotally secured to one end of a rigid link 107 the opposite end of which is pivotally connected to the intermediate portion of a treadle 108 having its inner end pivotally mounted between said pair of guide rails 92 adjacent the lower ends thereof. The treadle 108 projects outwardly through a suitable opening in the front wall panel 11 in laterally spaced relation to the treadle 49 for engagement by the foot of the operator. As shown in Fig. 3, the inverter roller 105 is normally located in underlying spaced relationship to the road engaging crown portion of the tire 22 between the supporting rollers 15 and 16, and is raised into a tire engaging and inverting position under downward movement of the outer end portion of the treadle 108. A coil tension spring 109 is anchored at one end to the treadle 108 and at its other end to a bracket or arm 110 extending forwardly from one of the adjacent guide rails 92, to yieldingly urge the treadle 108, link 107, and lever 106 in directions toward the inoperative position of the inverter roller 105.

As inverting of the road engaging crown portion of the tire, by use of the inverter roller 105, enables the operator to detect injuries or defects in the inner surface of the road engaging crown portion which otherwise might escape notice, so also are injuries or defects in the inner surfaces of the side wall portions of the tire 20 more easily detected by inverting the side walls. For the purpose of so inverting the side wall portions of the tire, I provide a pair of opposed tire side wall engaging and inverting rollers 111, each of which is journalled on the outer end of an arm 112 of each of a pair of bellcrank levers 113. The bellcrank levers 113 are pivotally mounted to a lug 114 secured to the upper rear cross frame member 6, on a common axis as indicated at 115, and further comprise lever arms 116 to the outer ends of which are pivotally connected the outer ends of a pair of toggle links 117. A rigid link 118 is pivotally connected to the inner ends of the toggle links 117 and has anchored to its intermediate portion a coil tension spring 119, the other end of which is secured to the lug 114, said spring 119 yieldingly urging the rigid link 118, the toggle links 117, and the bellcrank levers 113 in directions to spread the side wall inverting rollers apart to their inoperative positions out of engagement with the side walls of the tire 20. A rock arm or lever 120 is pivotally connected at its intermediate portion to a bracket 121 welded or otherwise rigidly secured to the rear lower cross frame member 7, and at one end said lever 120 is pivotally connected to the lower end of the rigid link 18, see Fig. 6. An elongated treadle lever 122 is pivotally secured intermediate its ends to a bracket 123 that is welded or otherwise rigidly secured to one of the base members 69, see Fig. 5. The rear end of the treadle lever 122 is operatively connected to the adjacent end of the rock arm or lever 120, the front end portion of the treadle lever 122 projecting forwardly through a suitable opening in the front panel 11 in laterally spaced relation to the treadles 49 and 108 for engagement by the foot of the operator. The coil tension spring 119, working through the link 118 and rock arm or lever 120 yieldingly biases the treadle lever 122 toward a raised position, and when said treadle lever 122 is depressed by the operator, the action of the toggle link 117 causes the side wall inverter rollers 111 to be moved from their inoperative position shown by full lines in Fig. 6 to their tire side wall engaging and inverting positions indicated by dotted lines in Fig. 6. It will be noted that the axes of the tire side wall engaging rollers 111 extend in directions generally radially of the tire 20, when the rollers are in engagement with the opposite side walls thereof, so that the rollers 111 do not materially affect or hinder rotary movement of the tire when the motor 28 is energized to impart rotation thereto.

*Tire tread and shoulder depressing mechanism*

To more easily enable the operator to detect radial cracks in the outer side wall surfaces of the tire 20, and to determine the depth of such cracks into the side walls of the tire, I provide a crown engaging wheel 124 that is journalled on the outer end of a crank arm 125 for rotation on a horizontal axis parallel to the axis of the tire 20 when the same is operatively positioned on the supporting and driving rollers 15 and 16. The arm 125 extends generally rearwardly from the wheel 124 and is pivotally secured at its rear end to the cross bar 9 for swinging movements on an axis parallel to the wheel and tire axes, as indicated at 126. This mounting of the arm 125 positions the wheel 124 above the top portion of the tire casing 20 forwardly of the guide rollers 21, see Figure 3. Means for imparting swinging movements to the arm 125 to move said arm and the wheel 124 between an inoperative position in upwardly spaced relation to the tire 20, indicated by dotted lines in Fig. 3, and an operative position wherein the wheel 124 engages the road engaging crown portion of the tire 20 and depresses the same to cause the side walls thereof to bulge axially outwardly, as shown in full lines in Fig. 3, comprises a fluid pressure cylinder 127 pivotally connected to the arm 125 as indicated at 128, and a cooperating piston equipped plunger rod 129 pivotally connected to a bifurcated bracket 130 extending angularly forwardly and upwardly from the top cross bar 8. As shown in Fig. 3, the bracket 130 is provided with a plurality of longitudinally spaced apertures 131 through a selected one of which a pivot 132 is adapted to extend to pivotally mount the outer end of the plunger rod 129. Preferably, the piston equipped plunger rod 129 is yieldingly urged in a direction with respect to the cylinder 127 to cause movement of the arm 125 toward its inoperative position, by a coil compression spring 133 within the cylinder 127. Fluid under pressure is introduced to the lower end of the cylinder 127 from a suitable source, not shown, through a valve 134 and a conduit 135. The valve 134 is of the type commonly used in fluid pressure systems and, it is believed, need not be described in detail. When fluid, such as air, is introduced to the cylinder 127, the wheel 124 is moved into depressing engagement with the crown surface of the tire 20 as it rotates on its own axis, to depress the engaged portion of the crown and adjacent shoulder portions of the tire, thereby bulging the underlying side wall portions of the tire in an axially outward direction. This bulging of the tire sidewalls causes temporary widening of any radial cracks which may exist in the outer rubber covering of the tire side walls, and the operator can quickly and easily determine whether such radial cracks extend into the fabric of the tire side walls underlying the rubber covering thereof.

From the above, it will be seen that I have provided a machine which will enable an operator to quickly and easily inspect a worn tire and determine the extent of any injuries to the tire or defects which may exist therein. Normally, when the tire is being inspected, the supporting and driving rollers 15 and 16 are driven at a very slow rate of speed. In the event repairable injuries are discovered on the inner wall surface of the tire 20, the motor 28 may be deenergized, the injured portion of the tire inverted and the necessary repairs made thereon while the tire is still mounted on the machine. In the event that exterior vulcanizing has been done on a tire, or if a tire has been retreaded, the same may be mounted in the machine and rotated at relatively high speed with the several spreader and other tire engaging rollers in their inoperative position, and a suitable rubber-cutting device, not shown may be then applied to the tire to sever any unwanted rubber from the exterior surface of the tire, such as is usually found after vulcanizing or treading operations.

My invention has been thoroughly tested and found to be completely satisfactory for the accomplishment of the objective set forth; and, while I have shown and described a preferred embodiment of my novel machine, it will be understood that the same is capable of modification without departure from the spirit and scope of the invention as defined in the claims.

What I claim is:

1. In a device for inspecting pneumatic tire casings, a frame structure; means on said frame structure for supporting a tire casing for rotation on a horizontal axis; a pair of opposed tire bead-engaging and spreading elements mounted for movements in directions radially and axially with respect to a casing mounted in said device; means including a reciprocatory member and linkage operatively connected to said reciprocatory member and said bead-engaging elements for moving said elements toward each other to dispose said elements radially inwardly of the beads of the tire casing and for moving said elements radially outwardly into engagement with the beads of the tire and in opposite directions axially of the tire to spread the beads apart responsive to movement of said reciprocatory member in one direction; said linkage comprising a pair of spreader arms, means connecting the lower ends of said arms to said reciprocatory member for common reciprocatory movements therewith and for pivotal movements relative thereto, and a pair of control links pivotally secured together at their inner ends and each pivotally connected outwardly of its inner end to the intermediate portion of a different one of said spreader arms; said bead-engaging elements comprising rollers journalled to the upper ends of said spreader arms; stop means engageable with said control links upon movement of said reciprocatory member in one direction to impart spreading movements to said spreader arms and bead-engaging rollers; means for imparting rotation to the tire casing on its own axis relative to said bead-engaging elements; said elements engaging and spreading a relatively small portion of the circumferential dimension of said beads, whereby said beads are spread apart only at the portions thereof engaged by said elements, said spread portions contracting axially during movement thereof away from said elements upon rotation of the tire casing.

2. The structure defined in claim 1 in which said reciprocatory member comprises a piston equipped plunger rod mounted for movement in a cooperating fluid pressure cylinder, said means connecting the spreader arms to said reciprocatory member comprising a crosshead on the outer end of said plunger rod, said stop means comprising a stop element movable transversely of the general direction of movement of said control links and plunger rod and providing a pair of abutment surfaces spaced apart in said direction of movement of the plunger rod and selectively engaging said control links to limit said common movement thereof with said spreader arms in one direction.

3. The structure defined in claim 2 in further combination with means yieldingly urging said spreader arms and said control links in a direction to move said bead engaging elements toward each other, engagement of said control links with a selected one of said abutment surfaces imparting bead spreading movements to said spreader arms responsive to movement of said plunger rod in said one direction.

4. The structure defined in claim 3 in which said frame structure includes guide means engaging the outer ends of said control links upon movement of said plunger rod in the opposite direction to move said control links and spreader arms in bead spreading directions when said bead-engaging rollers are disposed radially inwardly of the bead of said tire casing, whereby to permit placement of the casing on said tire supporting means and removal of the casing therefrom.

5. In a device for inspecting pneumatic tire casings, a frame structure, means on said frame structure for supporting a tire casing for rotation on a horizontal axis, a reciprocatory member extending in a direction generally radially with respect to a tire mounted on said tire supporting means, a pair of spreader arms, means pivotally mounting the lower ends of said arms to said reciprocatory member for common limited reciprocatory movements therewith and for pivotal movements relative thereto, a pair of spreader rollers journalled one each to the upper end of each of said spread arm and each angularly disposed with respect to the upper end of its respective spreader arm, and said spreader rollers being adapted to engage opposite inner face portions of the tire bead, a pair of pressure rollers one each journalled on the upper end of each of said spreader arms in angularly disposed relationship to its respective spreader roller, said pressure rollers being adapted to engage the inner circumferential surface portions of the bead of said tire casing to hold the same in operative engagement with the tire supporting means, means including said tire supporting means for imparting rotation to said tire relative to said arms, and means including said reciprocatory member and a pair of control links for imparting movement to said spreader arms in directions axially of the tire casing to dispose said rollers radially inwardly of the bead portions of the tire casing and for moving said spreader arms and rollers radially outwardly into engagement of the rollers with said bead portions and in opposite directions axially of the tire casing to spread the engaged bead portions apart, said spreader rollers spreading a relatively small portion of the circumferential dimension of said beads whereby said beads are spread apart only at the portions thereof engaged by said rollers, said spread portions of the tire casing contracting axially during movement thereof away from said rollers upon rotation of the tire casing.

6. The structure defined in claim 5 in which said tire casing supporting means comprises a pair of supporting and driving rollers journalled in said frame structure on laterally spaced parallel horizontal axes, and in further combination with means for inverting the road engaging crown portion of the tire casing, said last-mentioned means comprising an inverter roller disposed between said tire supporting rollers, and means mounting said inverter roller for movements toward and away from engagement with the road engaging crown surface portion of the tire casing below said pressure rollers.

7. The structure defined in claim 6 in which said inverter roller mounting means comprises, a lever pivotally mounted in said frame structure and journaling said inverter roller on an axis parallel to the axes of said tire supporting rollers, a treadle pivotally mounted in said frame structure adjacent its lower end, and a rigid link connecting said lever to said treadle, and in further combination with means yieldingly biasing said treadle, link and lever in directions to move said inverter roller away from operative engagement with said tire casing, said inverter roller having an axial dimension substantially less than the normal width of the road engaging crown portion of a tire casing mounted on said supporting rollers, said inverter roller being movable in a plane intersecting the axially central portion of said road engaging crown of the tire.

8. The structure defined in claim 5 in which said tire supporting means comprises, a pair of supporting and driving rollers journalled in said frame structure on laterally spaced parallel horizontal axes and adapted to underlie and engage circumferentially spaced portions of the road engaging crown surface of a tire casing, and in further combination with a pair of tire sidewall engaging rollers journalled on axes generally normal to the axes of said crown surface engaging rollers and mounted on said frame structure for movements in opposite directions toward and away from adjacent side wall surfaces of the tire casing in circumferentially spaced relation to said supporting and driving roller, said side wall engaging rollers being operative to move the engaged portion of the tire side walls axially inwardly relative to the bead portion of the tire to facilitate inspection and repair of the inner surfaces of said tire side walls.

9. The structure defined in claim 5 in which tire supporting means comprises, a pair of supporting and driving rollers journalled in said frame structure on laterally spaced parallel horizontal axes and adapted to underlie and engage circumferentially spaced portions of the road engaging crown surface of a tire casing, and a pair of tire side wall engaging roller elements, means journalling said roller elements for rotation on axes generally normal to the axes of said crown surface engaging rollers, said last-mentioned means comprising a pair of levers pivotally mounted in said frame structure, said side wall engaging rollers being journalled each to one end of a different one of said levers, and in further combination with linkage including a treadle pivotally mounted in the same structure for moving said levers in directions to carry said rollers into engagement with adjacent outer side wall surfaces of the tire, and yielding means urging said levers in the opposite direction to move said rollers away from said surfaces.

10. In a device for inspecting pneumatic tire casings, a frame structure, a pair of tire supporting elements on said frame structure adapted to underlie and engage circumferentially spaced portions of the road engaging crown surface of a tire to support the tire for rotation on its own horizontally extending axis, means including a pair of opposed tire bead engaging elements for spreading the bead portions of said tire to facilitate inspection of the interior of the tire, means including said tire supporting elements for imparting rotation to said tire relative to said bead engaging elements, a pair of rotary guide elements engageable each with an outer side wall surface portion of the tire adajcent the top of said tire to restrain the tire against lateral inclination, means mounting said guide elements on said frame for rotation on spaced parallel axes substantially normal to the axis of said tire and for limited simultaneous movements in common in opposite directions axially of the tire and means yieldingly urging said guide elements toward engagement with said tire.

11. The structure defined in claim 10 in which said guide element mounting means comprises a pair of spaced crank arms pivotally mounted on said frame structure, said guide elements each being journalled on the free end of a different one of said crank arms, and in further combination with a rigid link operatively connecting said crank arms together for common movement in opposite directions relative to each other, whereby said guide elements move simultaneously toward and away from their respective sides of said tire, and spring means yieldingly urging said guide elements in directions toward each other.

12. In a device for inspecting pneumatic tire casings, a frame structure, a pair of tire supporting elements on said frame structure adapted to underlie and engage circumferentially spaced portions of the road engaging crown surface of a tire to support the tire for rotation on its own horizontally extending axis, means including a pair of opposed tire bead engaging elements for spreading the bead portions of said tire to facilitate inspection of the interior of the tire, means including said tire supporting elements for imparting rotation to said tire relative to said bead engaging elements, and means for depressing a given portion of the road engaging crown and adjacent shoulders of the tire in circumferentially spaced relation to said bead engaging elements to cause the adjacent side wall portions thereof to bulge outwardly to expose existent radial cracks in the side walls of the tire, said depressing means comprising a crown engaging wheel, means mounting said wheel for rotation on an axis parallel to the axis of the tire on said supporting elements and for bodily movement generally radially of the tire toward and away from the crown portion thereof, and means for moving said wheel toward said tire under pressure sufficient to cause said depressing of the adjacent crown and shoulder portions of the tire.

13. The structure defined in claim 12 in which said wheel mounting means includes a crank arm pivotally connected at its inner end to said frame structure and journalling said wheel at its outer end, said means for moving the wheel towards said tire comprising a fluid pressure cylinder and a cooperating piston equipped plunger one of which is connected to the frame structure and the other of which is connected to said crank arm.

References Cited in the file of this patent

UNITED STATES PATENTS

| | | |
|---|---|---|
| Re. 14,765 | Urbach | Dec. 2, 1919 |
| 1,863,764 | Prentice | June 21, 1932 |
| 1,878,515 | Hazard | Sept. 20, 1932 |
| 2,310,891 | Branick | Feb. 9, 1943 |